June 12, 1945.  L. BOWMAN  2,378,125
AIR SCREW
Filed Nov. 12, 1941
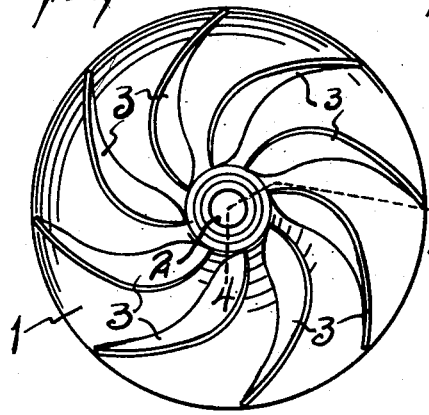
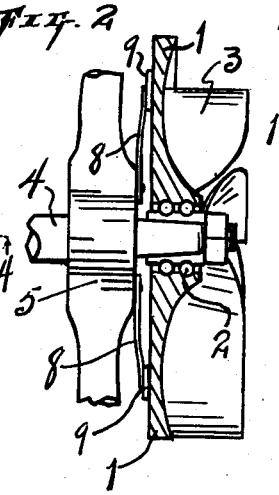
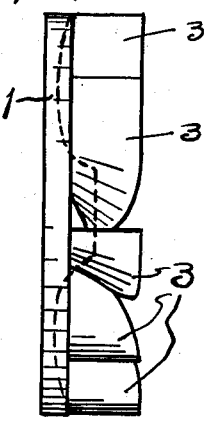
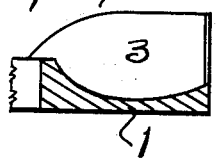
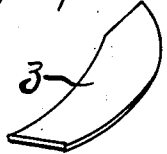
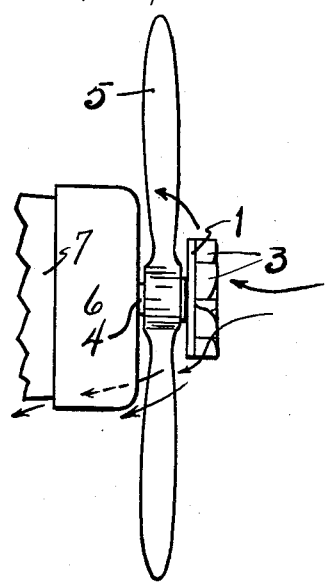
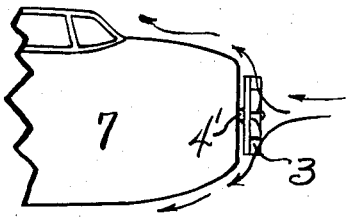
INVENTOR.
LEE BOWMAN.
BY
ATTORNEY.

Patented June 12, 1945

2,378,125

UNITED STATES PATENT OFFICE 2,378,125

AIRSCREW

Lee Bowman, Hollywood, Calif., assignor of twenty per cent to Charles A. Cooper, Carla Cooper, and Charles A. Cooper, Jr., all of Las Vegas, Nev., ten per cent to Charles Frederick Shield, Glendale, Calif., and five per cent to Patrick J. Healy, Los Angeles, Calif.

Application November 12, 1941, Serial No. 418,722

15 Claims. (Cl. 244—65)

My invention relates to air screws for air vehicles, and more particularly to an air screw which is free to rotate and which is adapted to direct the air around and about the fuselage and engine nacelle of an airplane.

An object of this invention is to provide a means for directing the air current into the efficient scope of operation of the airplane propeller and into the desired relation to the engine cowling.

Another object is to provide a simple device that will function to overcome the air resistance of the nose of an airplane fuselage, engine nacelles, gunner turrets and other blunt leading edges of a plane.

An advantage of this invention is that it may be used on the conventional design of aircraft in a manner to eliminate air drag of the nose of the ship and increase the efficiency of the propellers, thus materially increasing the speed and ease of control of the ship.

Another advantage of this air screw is that it may be used in conjunction with the airplane propeller and/or carried on the nose of a fuselage which is not provided with an engine.

Still another advantage of this air screw is that it is so formed as to draw the air into its center and then direct it out radially at the tips of its blades. The suction created by this screw serves to set up a vacuum in the front of the fuselage and the release of the air is directed so as to pass around and about the fuselage and also into that portion of the propeller which yields the greater efficiency.

Other objects and advantages will be fully explained in the following description and the invention will be more particularly pointed out in the claims.

Reference is had to the accompanying drawing which forms a part of this application.

Fig. 1 is a face view of the screw.

Fig. 2 is a vertical section of the screw, showing the same freely journaled on the airplane engine shaft and positioned in front of the propeller. This view also illustrates a suggested form of friction clutch which may be carried by the propeller and adapted to engage and actuate the screw.

Fig. 3 is an edge view of the air screw, showing the concave form of the face of the same in dotted outline.

Fig. 4 is a perspective view of one of the twisted, arc-shaped vanes of the screw.

Fig. 5 is a partial section of the air screw, taken on the line 4—4 of Fig. 1.

Fig. 6 is a detail view of the air screw when used in conjunction with the propeller of the plane. This view shows the approximate size of the air screw, relative to the propeller and the engine cowling. The arrows indicate the control of the air by the air screw.

Fig. 7 is a detail view of the device when carried on the nose of a fuselage. The arrows indicate the flow of air which is forced around the fuselage.

Similar characters of reference are used to indicate the same parts throughout the several views.

The air screw consists of a disk 1 which is centrally bored and provided with an anti-friction bearing 2. The face of the disk 1 may be termed as being concave. The face of the disk 1 is dished out so that the length of its central bore is greater than the thickness of the outer periphery of the disk. This concave form of the face of the disc serves to direct the air from its center, radially out to its outer periphery in an arc-shape or direction.

The face of the disk 1 is provided with a plurality of vanes 3 which are made rigid with the disk and positioned so as to radiate from the hub of the disk to the outer periphery of the disk. Each of these vanes is formed of relatively thin strips of material which are slightly twisted longitudinally and positioned in an arc-shape on the face of the disk 1. The end of each vane 3, adjacent the hub of the disk is sloped in towards the center of the disc 1. One edge of each of the strips or vanes 3 is formed to conform with the curvature of the disc 1 and is secured in a rigid manner to the disk 1. The inner portion of the vanes 3 serve to set up a suction which pulls the air into the center of the disk 1 and expells it out at the outer periphery of the same, thus directing the air into the propeller and around the fuselage, as shown in Fig. 6. The vanes 3, in this instance, are shown formed of rectangular twisted, arc-shaped design which are adapted to draw air similar to a suction fan. But it is obvious that various forms may be used that will function to draw the air into the concave face of the disk 1 so as to direct it around the fuselage of an aircraft and into the propeller.

It has been found that the air current set up by the movement of a plane in the air, is sufficient to actuate the air screw in order to secure its maximum efficiency. When the device is freely journaled on the propeller shaft, as shown in Fig. 6, it will rotate independently of the propeller and direct the air around the fuselage to such a degree as to increase the speed of travel of the plane. In this instance the antifriction bearing 2 is keyed or otherwise secured on the shaft 4 of the propeller 5 so that it may be free to rotate, as shown in Fig. 6. The air is then directed into the propeller 5, into the engine cowling 6 and around the fuselage 7.

In an instance where the device is to be used to eliminate air drag on the nose of a gunner's turret or the fuselage of a plane, the fuselage 7 may be provided with a stub shaft 4' which projects forward of the fuselage and serve to support the screw so that it may freely rotate, as shown in Fig. 7. It is obvious that the stub shaft 4' may be a hollow shaft which may permit the installation of a gun (not shown), thus permitting a fuselage design which is highly adaptable for military purposes with a minimum of wind resistance.

Fig. 2 illustrates a form of friction clutch which is adapted to be carried by the plane propeller and function to control the rotation of the air screw. A clutch for this purpose should work on the gyroscopic principle in order to permit a greater scope of freedom of operation of the air screw. This clutch may be constructed of relatively light thin resilient strips 8. One end of the strip 8 is attached to the hub of the propeller and the other end is positioned so as to radiate out towards the rear of the disk 1. A relatively heavy shoe 9 is secured to the free ends of the strips 8 and adapted to normally rest against the disk 1. Each strip 8 is slightly bent in the direction of the disk 1 and is of sufficient resiliency to force the shoe 9 against the disk. When the propeller 5 has attained a predetermined R. P. M., the gyroscopic pull of the shoes 9 will cause them to release the disk 1 and permit the screw to rotate free on the shaft 4. The advantage of the friction clutch is to provide means for checking the rotation of the air screw when landing the plane. The air screw, when locked against free rotation, sets up considerable air resistance, thus assisting in landing an aircraft. A clutch (not shown) may be provided on the stub shaft 4' of the fuselage for holding the air screw against free rotation when the ship is landed. The size and weight of the air screw is so minute, relative to other moving parts of an aircraft, that it will continue to rotate after the ship is landed.

It is obvious that various changes may be made in the shape and general arrangement of this device without departing from the spirit of my invention. The object is to provide a simple, inexpensive, light weight mechanism that may be carried forward of the propeller of an air craft and function to set up a vacuum in the front of the propeller hub and the nose of the engine nacelle or fuselage and direct the air flow into the desired relation with respect to the propeller and around the fuselage. This device has been used to increase the speed of an air vehicle without additional horsepower for the propeller.

What I claim is:

1. The combination in an aircraft having a propeller mounted on a rotatable shaft, of an air screw rotatably mounted on said shaft ahead of said propeller, which comprises: a disk having a relatively thick hub portion and an annular concave forward face surrounding said hub portion; a plurality of radially extending longitudinally twisted arc-shaped vanes carried on said forward face and rigid therewith, said vanes being of relatively thin sheet material and having their inner ends sloped in towards the center of said disk, whereby upon rotation of said air screw air is pulled into the center thereof and expelled outwardly at the periphery of said disk; and a friction clutch comprising a plurality of thin resilient radial strips fast to said propeller at their inner ends, and bowed outwardly with their outer ends engaging the rear face of said disk through the medium of friction shoes carried on the outer ends of said strips, whereby at low speeds said propeller and said air screw are frictionally connected, but at higher speeds said radial clutch strips will straighten and become disengaged from said disk to allow the same to freely rotate with respect to said propeller.

2. The combination in an aircraft having a propeller mounted on a rotatable shaft, of an air screw rotatably mounted on said shaft ahead of said propeller, which comprises: a disk having a relatively thick hub portion and an annular concave forward face surrounding said hub portion; a plurality of radially extending vanes carried on said forward face and rigid therewith, said vanes being of relatively thin sheet material and having their inner ends sloped in towards the center of said disk, whereby upon rotation of said air screw air is pulled into the center thereof and expelled outwardly at the periphery of said disk; and a friction clutch comprising a plurality of thin resilient radial strips fast to said propeller at their inner ends, and bowed outwardly with their outer ends engaging the rear face of said disk through the medium of friction shoes carried on the outer ends of said strips, whereby at low speeds said propeller and said air screw are frictionally connected, but at higher speeds said radial clutch strips will straighten and become disengaged from said disk to allow the same to freely rotate with respect to said propeller.

3. The combination in an aircraft having a propeller mounted on a rotatable shaft, of an air screw rotatably mounted on said shaft ahead of said propeller, which comprises: a disk having a relatively thick hub portion and an annular concave forward face surrounding said hub portion; a plurality of radially extending longitudinally twisted arc-shaped vanes carried on said forward face and rigid therewith, whereby upon rotation of said air screw air is pulled into the center thereof and expelled outwardly at the periphery of said disk; and a friction clutch comprising a plurality of thin resilient radial strips fast to said propeller at their inner ends, and bowed outwardly with their outer ends engaging the rear face of said disk through the medium of friction shoes carried on the outer ends of said strips, whereby at low speeds said propeller and said air screw are frictionally connected, but at higher speeds said radial clutch strips will straighten and become disengaged from said disk to allow the same to freely rotate with respect to said propeller.

4. The combination in an aircraft having a propeller mounted on a rotatable shaft, of an air screw rotatably mounted on said shaft ahead of said propeller, which comprises: a disk having a relatively thick hub portion and an annular concave forward face surrounding said hub portion; a plurality of radially extending vanes carried on said forward face and rigid therewith, whereby upon rotation of said air screw air is pulled into the center thereof and expelled outwardly at the periphery of said disk; and a friction clutch comprising a plurality of thin resilient radial strips fast to said propeller at their inner ends, and bowed outwardly with their outer ends engaging the rear face of said disk through the medium of friction shoes carried on the outer ends of said strips, whereby at low speeds said propeller and said air screw are frictionally connected, but at higher speeds said radial clutch strips will straighten and become disengaged from said disk to allow the same to freely rotate with respect to said propeller.

5. The combination in an aircraft having a propeller mounted on a rotatable shaft, of an air screw rotatably mounted on said shaft ahead of said propeller, which comprises: a disk having a concave forward face; a plurality of radially extending vanes carried on said forward face and rigid therewith, said vanes being of relatively thin sheet material and having their inner ends sloped in towards the center of said disk, whereby upon rotation of said air screw air is pulled into the center thereof and expelled outwardly at the periphery of said disk; and a friction clutch comprising a plurality of thin resilient radial strips fast to said propeller at their inner ends, and bowed outwardly with their outer ends engaging the rear face of said disk through the medium of friction shoes carried on the outer ends of said strips, whereby at low speeds said propeller and said air screw are frictionally connected, but at higher speeds said radial clutch strips will straighten and become disengaged from said disk to allow the same to freely rotate with respect to said propeller.

6. The combination in an aircraft having a propeller mounted on a rotatable shaft, of an air screw rotatably mounted on said shaft ahead of said propeller, which comprises: a disk having a concave forward face; a plurality of radially extending vanes carried on said forward face and rigid therewith, whereby upon rotation of said air screw air is pulled into the center thereof and expelled outwardly at the periphery of said disk; and a friction clutch comprising a plurality of thin resilient radial strips fast to said propeller at their inner ends, and bowed outwardly with their outer ends engaging the rear face of said disk through the medium of friction shoes carried on the outer ends of said strips, whereby at low speeds said propeller and said air screw are frictionally connected, but at higher speeds said radial clutch strips will straighten and become disengaged from said disk to allow the same to freely rotate with respect to said propeller.

7. The combination in an aircraft having a propeller mounted on a rotatable shaft, of an air screw rotatably mounted on said shaft ahead of said propeller, which comprises: a disk having a relatively thick hub portion and an annular concave forward face surrounding said hub portion; a plurality of radially extending longitudinally twisted arc-shaped vanes carried on said forward face and rigid therewith, said vanes being of relatively thin sheet material and having their inner ends sloped in towards the center of said disk, whereby upon rotation of said air screw air is pulled into the center thereof and expelled outwardly at the periphery of said disk; and a friction clutch comprising a plurality of thin resilient radial strips fast to said propeller at their inner ends, with their outer ends engaging the rear face of said disk, whereby at low speeds said propeller and said air screw are frictionally connected, but at higher speeds, said radial clutch strips become disengaged from said disk to allow the same to freely rotate with respect to said propeller.

8. The combination in an aircraft having a propeller mounted on a rotatable shaft, of an air screw rotatably mounted on said shaft ahead of said propeller, which comprises: a disk having a concave forward face; a plurality of radially extending vanes carried on said forward face and rigid therewith, whereby upon rotation of said air screw air is pulled into the center thereof and expelled outwardly at the periphery of said disk; and a friction clutch comprising a plurality of thin resilient radial strips fast to said propeller at their inner ends, with their outer ends engaging the rear face of said disk, whereby at low speeds said propeller and said air screw are frictionally connected, but at higher speeds said radial clutch strips become disengaged from said disk to allow the same to freely rotate with respect to said propeller.

9. The combination in an aircraft having a propeller mounted on a rotatable shaft, of an air screw rotatably mounted on said shaft ahead of said propeller which comprises: a disk having a relatively thick hub portion and an annular concave forward face surrounding said hub portion; and a plurality of radially extending longitudinally twisted arc-shaped vanes carried on said forward face and rigid therewith, said vanes being of relatively thin sheet material and having their inner ends sloped in towards the center of said disk, whereby upon rotation of said air screw air is pulled into the center thereof and expelled outwardly at the periphery of said disk and clutch means adapted to connect said air screw with said propeller at low speeds.

10. The combination in an aircraft having a propeller mounted on a rotatable shaft, of an air screw rotatably mounted on said shaft ahead of said propeller, which comprises: a disk having a relatively thick hub portion and an annular concave forward face surrounding said hub portion; and a plurality of radially extending vanes carried on said forward face and rigid therewith, whereby upon rotation of said air screw air is pulled into the center thereof and expelled outwardly at the periphery of said disk and a centrifugal clutch adapted to connect said air screw and propeller only at low speeds.

11. The combination in an aircraft having a propeller mounted on a rotatable shaft, of an air screw rotatably mounted on said shaft ahead of said propeller, which comprises: a disk having a concave forward face; and a plurality of radially extending longitudinally twisted arc-shaped vanes carried on said forward face and rigid therewith, said vanes being of relatively thin sheet material and having their inner ends sloped in towards the center of said disk, whereby upon rotation of said air screw air is pulled into the center thereof and expelled outwardly at the periphery of said disk and a friction clutch adapted to connect said airscrew with said propeller at predetermined speeds.

12. The combination in an aircraft having a propeller mounted on a rotatable shaft, of an air screw rotatably mounted on said shaft ahead of said propeller, which comprises: a disk having a concave forward face; and a plurality of radially extending vanes carried on said forward face and rigid therewith, whereby upon rotation said air screw air is pulled into the center thereof and expelled outwardly at the periphery of said disk and means for connecting said air screw with said propeller at low speeds and disconnecting them at predetermined higher speeds.

13. The combination with an aircraft having a propeller of an air screw mounted on a forward portion of said aircraft coaxially with said propeller which comprises: a disk having a relatively thick hub portion and an annular concave forward face surrounding said hub portion; a plurality of radially extending longitudinally twisted arc-shaped vanes carried on said forward face and rigid therewith, said vanes being of relatively thin sheet material and having their inner ends sloped in towards the center of said disk, whereby upon rotation of said air screw air is pulled into the center thereof and expelled outwardly at the periphery of said disk; and a friction clutch comprising a plurality of thin resilient radial strips fast to said propeller at their inner ends, and bowed outwardly with their outer ends engaging the rear face of said disk through the medium of friction shoes carried on the outer ends of said strips, whereby at low speeds said propeller and said air screw are frictionally connected, but at higher speeds said radial clutch strips will straighten and become disengaged from said disk to allow the same to freely rotate with respect to said propeller.

14. The combination with an aircraft having a propeller of an air screw mounted on a forward portion of said aircraft coaxially with said propeller which comprises: a disk having a concave forward face; a plurality of radially extending vanes carried on said forward face and rigid therewith, whereby upon rotation of said air screw air is pulled into the center thereof and expelled outwardly at the periphery of said disk; and a friction clutch comprising a plurality of thin resilient radial strips fast to said propeller at their inner ends, and bowed outwardly with their outer ends engaging the rear face of said disk through the medium of friction shoes carried on the outer ends of said strips, whereby at low speeds said propeller and said air screw are frictionally connected, but at higher speeds said radial clutch strips will straighten and become disengaged from said disk to allow the same to freely rotate with respect to said propeller.

15. The combination with an aircraft having a propeller of an air screw on the forward end of said aircraft coaxially with said propeller comprising: a disk having a plurality of vanes thereon and adapted to be rotated by forward movement of said aircraft, and to pull air into the center thereof and expel it at the periphery, to thereby decrease the drag of said aircraft and a clutch for connecting and disconnecting said air-screw with said propeller at predetermined speeds.

LEE BOWMAN.